US012589657B2

(12) United States Patent
Cai

(10) Patent No.: US 12,589,657 B2
(45) Date of Patent: Mar. 31, 2026

(54) WHEEL-TRACK MAGNETIC SUSPENSION VEHICLE SYSTEM AND APPLICATION THEREOF

(71) Applicant: JINAN SHANGHAI FLUID CONTROL EQUIPMENT CO., LTD, Shandong (CN)

(72) Inventor: Feng Cai, Shandong (CN)

(73) Assignee: JINAN SHANGHAI FLUID CONTROL EQUIPMENT CO., LTD, Shandong (CN)

( * ) Notice: Subject to any disclaimer, the term of this patent is extended or adjusted under 35 U.S.C. 154(b) by 669 days.

(21) Appl. No.: 18/001,842

(22) PCT Filed: Jan. 12, 2021

(86) PCT No.: PCT/CN2021/071318
§ 371 (c)(1),
(2) Date: Dec. 14, 2022

(87) PCT Pub. No.: WO2021/253818
PCT Pub. Date: Dec. 23, 2021

(65) Prior Publication Data
US 2023/0234450 A1 Jul. 27, 2023

(30) Foreign Application Priority Data
Jun. 17, 2020 (CN) .......................... 202010554726.5

(51) Int. Cl.
*B60L 13/10* (2006.01)
*B60K 7/00* (2006.01)
(52) U.S. Cl.
CPC ............ *B60L 13/10* (2013.01); *B60K 7/0007* (2013.01); *B60K 2007/0038* (2013.01)

(58) Field of Classification Search
CPC .................. B60L 13/10; B60K 7/0007; B60K 2007/0038
See application file for complete search history.

(56) References Cited

U.S. PATENT DOCUMENTS 6,899,036 B2 5/2005 Lamb et al.

FOREIGN PATENT DOCUMENTS

CN 1686736 A 10/2005
CN 106627245 A 5/2017
(Continued)

OTHER PUBLICATIONS

International Search Report for PCT/CN2021/071318 (Apr. 1, 2021).

*Primary Examiner* — Robert J McCarry, Jr.
(74) *Attorney, Agent, or Firm* — Merchant & Gould P.C.

(57) ABSTRACT

A wheel-track magnetic suspension vehicle system includes a U-shaped channel and a magnetically-suspended vehicle therein. Arranged at the bottom of the U-shaped channel are two permanent magnet roadbeds and one wheel roadbed. Provided on the two permanent magnet roadbeds is a permanent magnet A; the magnetically-suspended vehicle includes a compartment body, a chassis, a front drive wheel, and a rear drive wheel. Two sides of the chassis are provided with a permanent magnet B. Permanent magnet B and permanent magnet A are vertically aligned and have the same polarity. The front drive wheel and rear drive wheel are arranged on the wheel roadbed. The two sides of the top part of the U-shaped channel are equipped with power supply line banks. The two sides of the compartment body are equipped with power pickup cables.

11 Claims, 6 Drawing Sheets

(56) References Cited

FOREIGN PATENT DOCUMENTS

| CN | 108394312 A | * | 8/2018 | .............. B61H 9/00 |
|----|-------------|---|--------|-------------------------|
| CN | 111572362 A |   | 8/2020 |                         |
| KR | 20100070611 A |  | 6/2010 |                       |

* cited by examiner

WHEEL-TRACK MAGNETIC SUSPENSION VEHICLE SYSTEM AND APPLICATION THEREOF

CROSS REFERENCE

This application is the national phase of International Application No. PCT/CN2021/071318, titled "WHEEL-TRACK MAGNETIC SUSPENSION VEHICLE SYSTEM AND APPLICATION THEREOF", filed on Jan. 12, 2021, which claims the benefit of priority to Chinese Patent Application No. 202010554726.5, titled "WHEEL-RAIL MAGLEV VEHICLE SYSTEM AND APPLICATION THEREOF", filed with the China National Intellectual Property Administration on Jun. 17, 2020, the entire disclosures of which are incorporated herein by reference.

FIELD

The present application relates to a wheel-rail maglev vehicle system and application thereof, and in particular to an electric-driven wheel-rail vehicle system based on magnetic levitation, which belongs to the technical field of maglev vehicles.

BACKGROUND

At present, the existing permanent maglev vehicle cannot make the vehicle perform actions such as uphill and downhill running, small radius steering, which greatly limits the development space of maglev vehicles.

For example, Chinese patent CN106274549A discloses a permanent maglev vehicle, including a carriage, magnet driving wheels, guide tracks, a buoyancy frame and a track pit, the magnet driving wheels are horizontally arranged at both sides of the carriage, the guide tracks are arranged at upper and lower sides of the magnet driving wheels; the buoyancy frame includes a carriage buoyancy frame and a subgrade buoyancy frame; the carriage buoyancy frame is arranged at the bottom of the carriage, the subgrade buoyancy frame is arranged at the bottom of the track pit, the guide tracks are arranged at inner walls of both sides of the track pit; the carriage is of a box structure, the magnet driving wheel is disc-shaped, a bearing is arranged in the center of the magnet driving wheel; and the magnet driving wheel is connected with the carriage through a rotating shaft. This application has the advantages that: the structure adopted by the new-type maglev vehicle makes the vehicle fast and low in operation cost; the vehicle has high acceleration and buoyancy; the vehicle also has a light body structure, with NdFeB permanent magnets, electricity is not needed, which is energy-saving and environment-friendly. Chinese patent CN108482184A discloses a new energy distributed electric-driven maglev vehicle, including a vehicle body, a high-temperature superconducting operation system for running on magnetic levitation tracks and a distributed electric-driven operation system for running on a common road, the high-temperature superconducting operation system and the distributed electric-driven operation system are located inside the vehicle body and drive the vehicle body to move. The high-temperature superconducting operation system includes a magnetic levitation control system, an induction power integrated superconducting magnet, a power integrated winding, and a guide mechanism. The induction power integrated superconducting magnet and the power integrated winding are both distributed inside the vehicle body in pairs, the integrated power winding is located between adjacent induction power integrated superconducting magnets, the guide mechanism is positioned between adjacent power integrated windings. The distributed electric-driven operation system includes a hub motor, an active suspension system, tires, a steering system and a drive power battery, the distributed electric-driven operation system, the control system and the steering system are connected with the tires through the active suspension system.

It is found by searching that the conventional permanent maglev vehicle can only run on plane tracks, and there is no good solution for other running states such as turning, running uphill, and running downhill.

SUMMARY

In view of the shortcomings of conventional technology, a wheel-rail maglev vehicle system is provided according to the present application.

An operating method of the wheel-rail maglev vehicle system is further provided according to the present application.

Technical solutions of the present disclosure are described as follows.

A wheel-rail maglev vehicle system, including a U-shaped channel and a maglev vehicle in the U-shaped channel; where two permanent magnet subgrades and one wheel subgrade are provided at a bottom of the U-shaped channel, the two permanent magnet subgrades are located at both sides of the wheel subgrade respectively, and a permanent magnet A is laid on each of the two permanent magnet subgrades;

the maglev vehicle includes a carriage, a chassis, a front driving wheel and a rear driving wheel, the front driving wheel and the rear driving wheel are connected to front and rear sides of the carriage respectively, the carriage is mounted on the chassis, a permanent magnet B is arranged at each of two sides of the chassis, the permanent magnet B corresponds to the permanent magnet A in an up and down direction and has the same polarity, and the front driving wheel and the rear driving wheel are arranged on the wheel subgrade; and two sides of a top of the U-shaped channel are each provided with a power supply bus bar, two sides of the carriage are each provided with a power pick-up cable, and the power pick-up cable is in contact with the power supply bus bar to provide power for the maglev vehicle.

Preferably, each of the front driving wheel and the rear driving wheel is an electric driving wheel.

Preferably, the electric driving wheel includes a motor, a wheel, elastic support anus, a mounting plate and an electric steering mechanism; the motor is arranged in a center of the wheel and fixedly connected with the wheel, two ends of an output shaft of the motor are connected with the elastic support arms respectively, one side of the mounting plate is fixedly connected with the carriage, and the electric steering mechanism is arranged on the mounting plate and connected with top ends of the elastic support arms.

Preferably, the electric driving wheel includes wheels, motors, a wheel shaft, a mounting plate, elastic support anus and an electric steering mechanism; both ends of the wheel shaft are respectively connected with output shafts of the two motors, each of the two motors is set in a center of the corresponding wheel and is fixedly connected with the wheel, and a bottom end of each of the elastic support anus is fixedly connected with the wheel shaft, one side of the mounting plate is fixedly connected with the carriage, and the electric steering mechanism is arranged on the mounting plate and connected with top ends of the elastic support arms.

Preferably, the motor is an external rotor motor.

Preferably, a motor casing is connected with the wheel through a key.

Preferably, the chassis is further provided with an electromagnet, the electromagnet is mainly composed of an electromagnetic coil, the electromagnet generates magnetism by the energized electromagnetic coil. The advantage of this design is that, in case that there is imbalance between front and rear, left and right when the vehicle is running, the magnetic field generated by the electromagnetic coil is used to balance the vehicle.

Preferably, the chassis is further provided with an electric magnetic base, the electric magnetic base includes a motor, a rotating shaft and a permanent magnet C, an output shaft of the motor is connected with the rotating shaft, and at least one permanent magnet C is arranged on the rotating shaft. The advantage of this design is that, the polarity direction of the permanent magnet C is adjusted by the motor, in an operating state, the permanent magnet C and the permanent magnet A have the same polarity and thus a repulsive force is generated; in a non-operating state, there is no repulsive force between the permanent magnet C and the permanent magnet A, and the magnetic field can be adjusted to ensure that the carriage is at a reasonable height.

Preferably, the wheel subgrade is at a same distance with respect to the two permanent magnet subgrades, and the two permanent magnet subgrades are at a same distance with respect to the respective walls of the U-shaped channel.

Preferably, a drainage groove is provided at the bottom of the U-shaped channel. The advantage of this design is that, the drainage groove can prevent water accumulation at the bottom of the U-shaped channel, after cleaning the U-shaped channel, sewage can flow out from the drainage groove.

Preferably, eight spring hydraulic support guide wheels are symmetrically arranged at both sides of the carriage respectively, the spring hydraulic support guide wheels are in contact with both side walls of the U-shaped channel respectively. The advantage of this design is that, the spring hydraulic support guide wheels can prevent the carriage from tilting during operation.

Preferably, each of the spring hydraulic support guide wheels includes a hydraulic support fixed seat, a hydraulic cylinder, a spring, a guide wheel shaft and a roller, a cylinder barrel of the hydraulic cylinder is fixed on the hydraulic support fixed seat, the hydraulic support fixed seat is mounted on a side wall of the carriage through bolts, a spring is sleeved on a piston rod of the hydraulic cylinder, a head of the piston rod is fixedly connected with the guide wheel shaft, and the guide wheel shaft is connected with a center of the roller by a key connection.

Preferably, a storage battery and a control system are arranged in the carriage. The advantage of this design is that, the control system in the carriage can control the operating state of the driving wheels, so as to control the running, stopping, acceleration, deceleration and energy recovery of the maglev vehicle, and the maglev vehicle is charged while running, and the excess power can be stored in the battery, when the external power supply fails, the battery can supply the power, which will not affect the operation of the maglev vehicle.

Preferably, an air conditioning and purification system is arranged in the carriage.

Preferably, a left-right balancer is arranged at each of front and rear sides inside the carriage, the left-right balancer includes a driving motor, a base, a screw rod and a counterweight sliding block; where the screw rod is arrange on the base, one end of the screw rod is connected with an output shaft of the driving motor, and the counterweight sliding block is screwed on the screw rod. The advantage of this design is that, in case that the passengers are uneven in the carriage, the carriage can be rebalanced.

Preferably, a front-rear balancer is arranged each of left and right sides inside the carriage, the front-rear balancer includes a driving motor, a base, a screw rod and a counterweight sliding block; where the screw rod is arrange on the base, one end of the screw rod is connected with an output shaft of the driving motor, and the counterweight sliding block is screwed on the screw rod.

Preferably, electric carriage doors are arranged on both sides of the carriage, and the electric carriage doors are connected with the control system. The advantage of this design is that, electric carriage doors are arranged on both sides of the carriage to facilitate getting on and off of the passengers.

Preferably, at least one third of the carriage is located in the U-shaped channel.

Preferably, the control system includes a PLC and a wireless communication module, the vehicle can transmit data with a dispatch center through the wireless communication module.

Preferably, in the U-shaped channel: in a flat road section, the wheel subgrade is flush with the permanent magnet subgrades; in an uphill or downhill road section, the wheel subgrade is higher than the permanent magnet subgrades. The advantage of this design is that, in case of running uphill or downhill or turning, the permanent magnets and electromagnets at the bottom of the vehicle are separated from the permanent magnet magnetic field on the permanent magnet subgrades, which facilitates uphill and downhill running, turning and stopping at the station.

Preferably, a limiting arm is arranged at each of the front and rear sides of the carriage. The advantage of this design is that, the limiting arm can prevent vehicles from rear-end collision; besides, when a maglev vehicle fails to move forward, it can be pushed by the maglev vehicles at its front and rear ends to get to the station for maintenance.

Preferably, a suction cup is arranged at the top of the carriage. The advantage of this design is that, at the station, it is convenient for the gantry crane of the station to lift the maglev vehicle out of the U-shaped channel, so that the following vehicles can pass quickly, and it is convenient for passengers to get on and off leisurely.

An operating method of the wheel-rail maglev vehicle system, including the following steps:

1. stopping the maglev vehicle at a platform of a station, and controlling, by a control system, an electric carriage door to close after passengers getting on and off the carriage.
2. starting the front driving wheels and the rear driving wheels by the control system, and energizing an electromagnet, to make a repulsive force be generated between the electromagnet and the permanent magnet A, to levitate the carriage;
3. controlling motors to be energized by the control system, to make the motors work to drive the wheels to rotate, and the maglev vehicle is moved forward;

4. during a process that the maglev vehicle moves forward, controlling the energized current of the motors by the control system, to achieve acceleration or deceleration;

5. when the vehicle is about to arrive at another station, deenergizing the electromagnet by the control system, to make the repulsive force between the electromagnet and the permanent magnet A disappear; and at the same time, deenergizing the motors by the control system, and the carriage travels to the station under inertia;

6. controlling the electric carriage door to open by the control system, to allow the passengers to get on or off the carriage;

7. repeating the steps 1 to 6, to realize continuous operation of the maglev vehicle.

The present disclosure has the following beneficial effects.

1. The maglev vehicle of the present application is an improvement to the conventional permanent maglev vehicle, the conventional permanent maglev vehicle cannot make the vehicle run uphill or downhill, or turn in a small radius and other actions, which greatly limits the development space, the maglev vehicle according to the present application can effectively avoid the above defects and can meet most road conditions.

2. For the maglev vehicle of the present application, because of the permanent magnetism of the permanent magnet, if the magnet does not have a high temperature of more than 140 degrees on the magnetic track, the magnet can be a permanent magnet, the permanent magnetic material on the magnetic levitation track of the present application can be used for decades or even up to hundreds of years with investment for only once, which obviously saves energy.

3. The maglev vehicle of the present application employs electric driving wheels to make it run stably, which can replace the gasoline vehicle on the road, the consumption of gasoline and diesel can be reduced, and the effects of energy conservation, emission reduction and foreign exchange saving are achieved. The U-shaped channel can be built overhead or embedded underground to reduce traffic pressure.

4. The maglev vehicle of the present application adopts personalized operation lines, automatically combine passengers in the same direction according to special APP software, which facilitates passengers to directly reach the destination without stopping midway, reduces the number of transfer stations of the passengers, thereby saving energy and reducing emissions, and offering a good riding experience.

Figure 1:
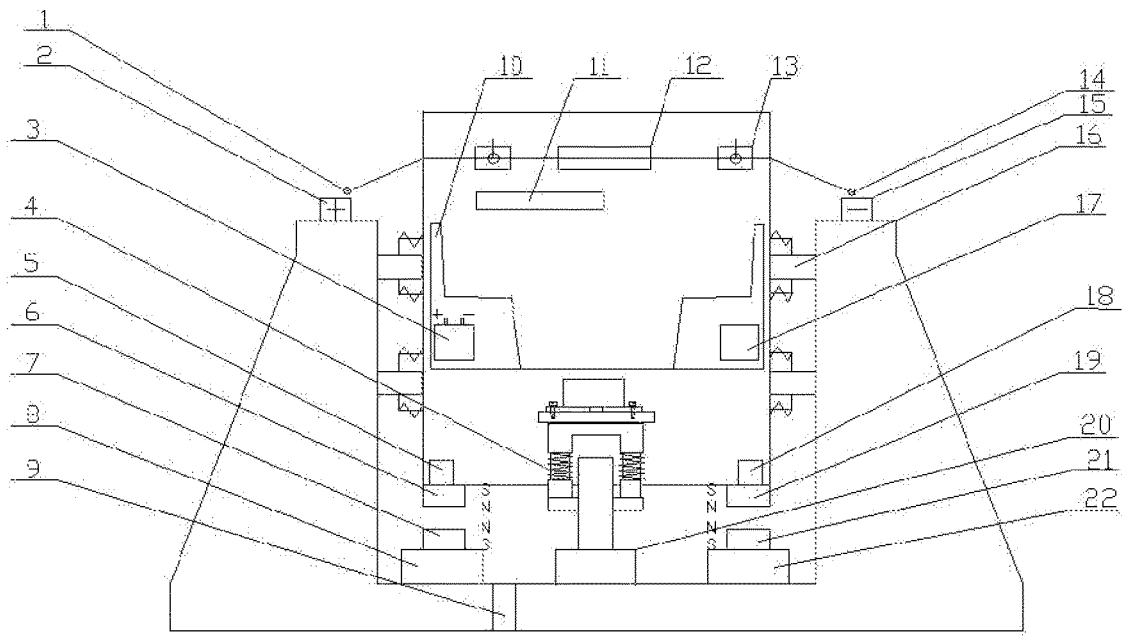
FIG. 1 is a front view of a wheel-rail maglev vehicle system according to the present application.

REFERENCE NUMERALS IN THE FIGURES 1 left pick-up cable,
2 left power supply bus bar,
3 battery,
4 front driving wheel,
5 left electric magnetic base,
6 left permanent magnet B,
7 left permanent magnet A,
8 left permanent magnet subgrade,
9 drainage groove,
10 seat,
11 air conditioning and purification system,
12 left-right balancer,
13 front-rear balancer,
14 right pick-up cable,
15 right power supply bus bar,
16 spring hydraulic support guide wheel,
1601 roller,
1602 spring,
1603 hydraulic support fixed seat,
1604 guide wheel shaft,
1605 hydraulic cylinder,
1606 bolt,
17 control system (including front and rear drive of vehicle, vehicle balance, air conditioning management, power supply management, positioning, data transmission),
18 right electric magnetic base,
19 right permanent magnet B,
20 wheel subgrade,
21 right permanent magnet A,
22 right permanent magnet subgrade,
23 electric steering mechanism,
24 mounting plate,
25 wheel,
26 carriage door,
27 mounting plate,
28 electric steering mechanism,
29 wheel.
30 wheel subgrade floating section,
31 elastic support arm,
32 electromagnetic coil,
33 probe for measuring magnetic pole spacing,
34 elastic support arm,
35 bottom permanent magnet,
36 electromagnetic coil in energized state,
37 electric magnetic base in operating state,
38 electromagnetic coil in deenergized state.
39 electric magnetic base in non-operating state,
40 motor,
41 driving motor,
42 screw rod,
43 counterweight sliding block,
44 driving motor,
45 screw rod,
46 counterweight sliding block,
47 stereo garage,
48 elevator,
49 gantry crane driving motor,
50 gantry crane magnetic chuck,
51 overhead U-shaped channel, 52 gantry crane,
53 ground parking lot,
54 tire,
55 wheel hub,
56 permanent magnet,
57 stator winding,
58 rotor,
59 motor controller,
60 brake,
61 bearing.

DETAILED DESCRIPTION OF THE EMBODIMENTS

The present application is further illustrated with the following embodiments in conjunction with the drawings, but it is not limited to this.

First Embodiment

Figure 2:
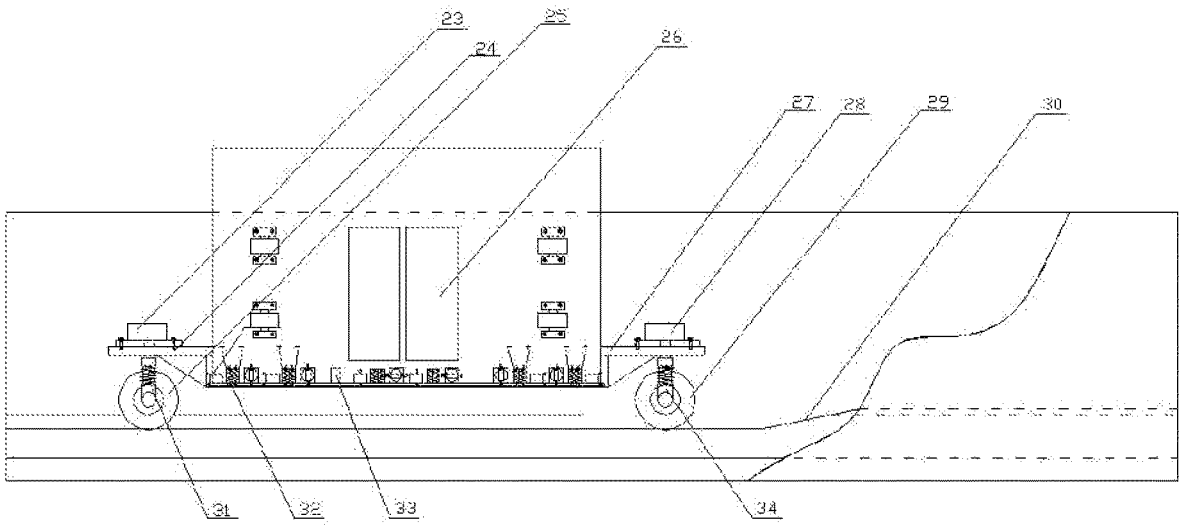
FIG. 2 is a side view of the wheel-rail maglev vehicle system according to the present application.

As shown in FIG. 1 and FIG. 2, a wheel-rail maglev vehicle system is provided according to this embodiment, including a U-shaped channel and a maglev vehicle in the U-shaped channel;

two permanent magnet subgrades (a left permanent magnet subgrade 8 and a right permanent magnet subgrade 22) and one wheel subgrade 20 are provided at a bottom of the U-shaped channel, the two permanent magnet subgrades are located at both sides of the wheel subgrade 20 respectively, and permanent magnets A (a left permanent magnet A7 and a right permanent magnet A21) are laid on the two permanent magnet subgrades respectively;

the maglev vehicle includes a carriage, a chassis, front driving wheels 4 and rear driving wheels, the front driving wheels 4 and the rear driving wheels are connected to front and rear sides of the carriage respectively, the carriage is mounted on the chassis, permanent magnets B (a left permanent magnet B6 and a right permanent magnet B19) are arranged at two sides of the chassis respectively, the permanent magnets B corresponds to the permanent magnets A in an up and down direction and have the same polarity, and the front driving wheels and the rear driving wheels are placed on the wheel subgrade 20; and two sides of a top of the U-shaped channel are provided with power supply bus bars respectively (a left power supply bus bar 2 and a right power supply bus bar 15), and two sides of the carriage are provided with power pick-up cables respectively (a left power pick-up cable 1 and a right power pick-up cable 14), the power pick-up cable is in contact with the power supply bus bar to provide power for the maglev vehicle.

Specifically, the front driving wheel and the rear driving wheel are both electric driving wheels, and their structures are completely the same. The electric driving wheel includes a motor, a wheel 29, elastic support anns 31, a mounting plate and an electric steering mechanism; the motor is arranged in a center of the wheel and fixedly connected with the wheel, two ends of an output shaft of the motor are connected with the elastic support arms 31 respectively, one side of the mounting plate 24 is fixedly connected with the carriage, and the electric steering mechanism 23 is arranged on the mounting plate 24 and connected with top ends of the elastic support arms 31.

The motor is an external rotor motor, and a motor casing is connected with the wheel 25 through a key connection.

When the motor is powered on and started, the motor casing and the electromagnetic coil function as a rotor, which drives the wheel 25 to rotate, and the output shaft of the motor functions as a stator. The electric steering mechanism adopts conventional technology, and a steering motor is mounted on the mounting plate 24 by bolts. The output shaft of the steering motor passes through the threaded hole of the mounting plate 24 through the bearing and is connected with the elastic support arm 31.

The chassis is further provided with an electromagnet, which is mainly composed of an electromagnetic coil 32, and the electromagnet generates magnetism by the energized electromagnetic coil 32. In case that there is imbalance between front and rear or left and right when the vehicle is running, the magnetic field generated by the electromagnetic coil 32 is used to rebalance the vehicle.

Figure 4:
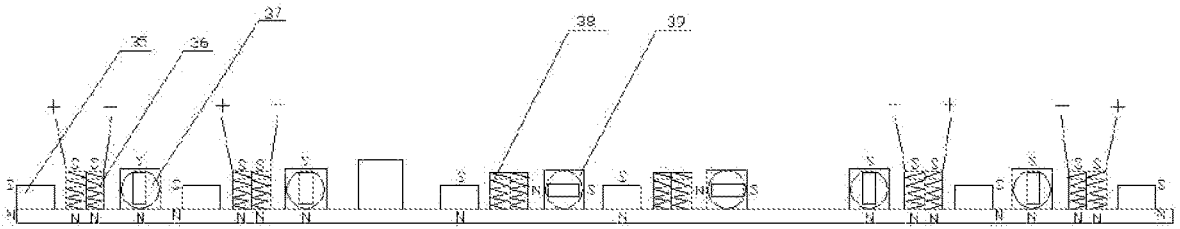
FIG. 4 is a view showing the composition of a bottom of a carriage according to the present application.
Figure 5:
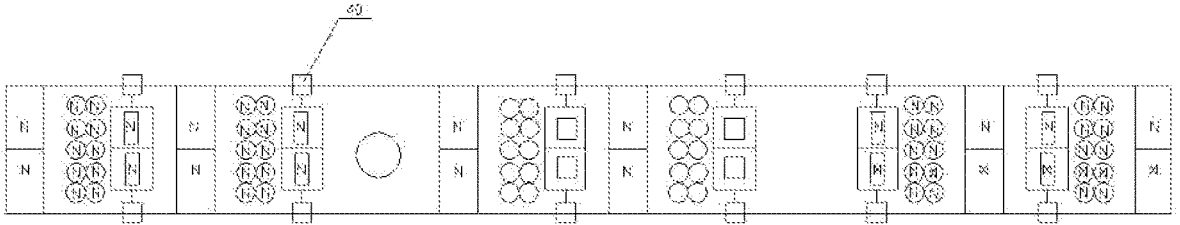
FIG. 5 is a top view of FIG. 4.
Figure 6:
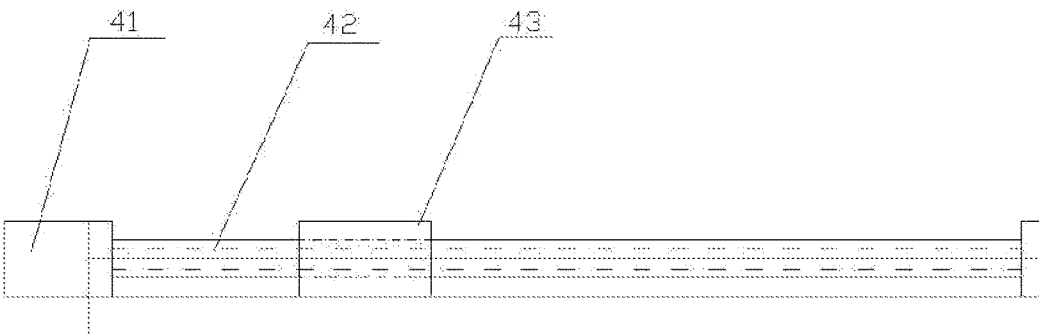
FIG. 6 is a view showing the structure of a left-right balancer according to the present application.
Figure 7:
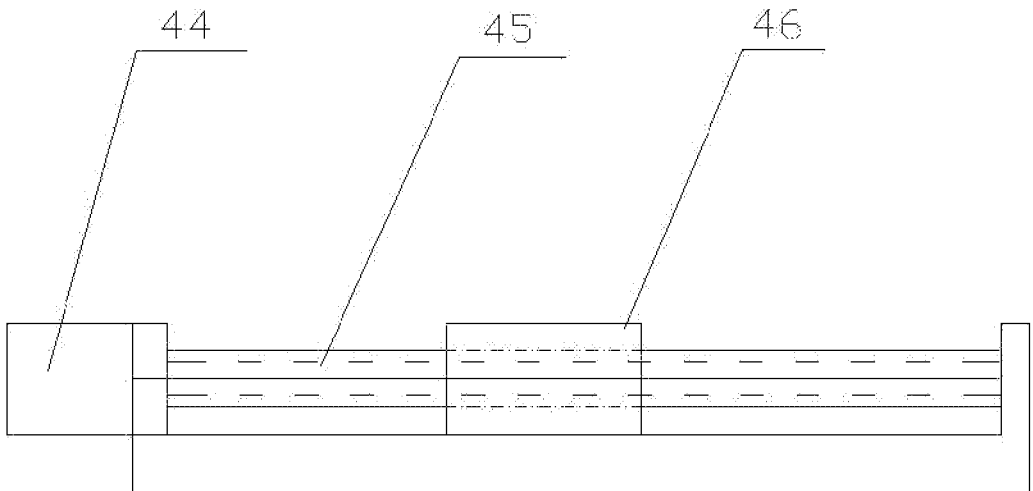
FIG. 7 is a view showing the structure of a front-rear balancer according to the present application.

As shown in FIG. 4 and FIG. 5, the chassis is further provided with an electric magnetic base, the left and right sides of the chassis are respectively provided with a left electric magnetic base and a right electric magnetic base. The electric magnetic base includes a motor, a rotating shaft and a permanent magnet C, an output shaft of the motor is connected with the rotating shaft, and at least one permanent magnet C is arranged on the rotating shaft. The polarity direction of the permanent magnet C is adjusted by the motor, in the operating state, the permanent magnet C is in a vertical state, and a repulsive force is generated between the permanent magnet C and the permanent magnet A; in the non-operating state, the permanent magnet C is in a horizontal state, there is no repulsive force between the permanent magnet C and the permanent magnet A, and the electric magnetic base functions to regulate the magnetic field.

The repulsive force generated by the permanent magnet B to permanent magnet A on the magnetic track makes the vehicle levitate and meet the basic load requirement, when overloading of the vehicle occurs due to the increase of passengers, the electric magnetic base is started, the permanent magnet C generates a repulsive force on the permanent magnet A to keep a designed gap between the carriage and the permanent magnet A, thus the situation that the vehicle cannot be controlled due to fluctuation of the vehicle in height is avoided.

A storage battery 3 and a control system 17 are arranged in the carriage. The control system in the carriage can control the operating state of the motor, so as to control the forward running, stopping, acceleration and deceleration of the maglev vehicle, besides, the maglev vehicle is charged while running, and the excess power can be stored in the battery, when the external power supply fails, the battery can supply the power, which will not affect the operation of the maglev vehicle.

A left-right balancer 12 is arranged at each of the front and rear sides inside the carriage, the left-right balancer includes a driving motor 41, a base, a screw rod 42 and a counterweight sliding block 43. The screw rod 42 is arrange on the base, one end of the screw rod 42 is connected with an output shaft of the driving motor 41, and the counterweight sliding block 43 is screwed on the screw rod 42. In case that the passengers are uneven in the carriage, the carriage can be rebalanced.

A front-rear balancer 13 is arranged at each of the left and right sides inside the carriage, the front-rear balancer includes a driving motor 44, a base, a screw rod 45 and a counterweight sliding block 46. The screw rod 45 is arrange on the base, one end of the screw rod 45 is connected with an output shaft of the driving motor 44, and the counterweight sliding block 46 is screwed on the screw rod 45. Both the left-right balancers 12 and the front-rear balancers 13 can be adjusted before the vehicle runs, to ensure the stability of the vehicle during running.

Electric carriage doors 26 are arranged on both sides of the carriage, and the electric carriage doors are connected with the control system. The advantage of this design is that, electric carriage doors arranged on both sides of the carriage make it convenient for the passengers to get on and off the vehicle.

In the U-shaped channel, at least one third of the carriage is located in the U-shaped channel, to ensure the stability of the carriage during operation. The wheel subgrade is at a same distance with respect to the two permanent magnet subgrades, and the two permanent magnet subgrades are at a same distance with respect to and the respective walls of the U-shaped channel. In a flat road section, the wheel subgrade is flush with the permanent magnet subgrades; in an uphill or downhill road section, the wheel subgrade is higher than the permanent magnet subgrade. In case of running uphill or downhill or turning, the permanent magnets and electromagnets at the bottom of the vehicle are separated from the permanent magnet magnetic field on the permanent magnet subgrades, which facilitates uphill and downhill running, turning and stopping at the station.

A limiting arm is arranged at each of the front and rear sides of the carriage. The limiting arm can prevent vehicles from rear-end collision; besides, when a maglev vehicle fails to move forward, it can be pushed by the maglev vehicles at its front and rear ends to get to the station for maintenance.

The control system includes a PLC and a wireless communication module, the vehicle can transmit data with a dispatch center through the wireless communication module. The automatic control system of the vehicle can accurately control each on-track vehicle by using big data through vehicle positioning, uploading and downloading real-time data under 5G network, to perform deceleration, acceleration, steering and braking on the driving wheels, so as to make the vehicle run optimally.

There are soft and hard seats in the carriage, which is convenient for different use requirements. An air conditioning and purification system is arranged in the carriage, to improve the comfort level in the carriage and make the riding more comfort. Lighting systems are mounted inside and outside the carriage, and reading lamps which facilitate reading of the passengers are arranged inside the carriage, colorful display lamps are arranged outside the carriage, which play a warning role when the vehicle runs at night, especially when entering the station.

An automatic driving program is installed in the control system, which can realize the automatic operation of the vehicle. In addition, all electrical equipment, including motors, electromagnetic coils, balancers, electric magnetic bases, etc., are automatically controlled by the control system, the circuit and control connection can be realized by conventional technology.

The working principle of the technical solution of this embodiment is as follows.

The present application utilizes the principle that permanent magnets with the same polarity repel each other, the vehicle is levitated by the repulsive force generated between the permanent magnet B located at the bottom of the carriage and the permanent magnet which has the same polarity with the permanent magnet B and is laid on the magnetic track at the bottom of the U-shaped channel groove; and the front and rear electric driving wheels of the vehicle rub the road surface to generate friction forces, which make the vehicle perform forward and backward movements. The electric driving device includes an electric driving wheel, front and rear support arms with spring damping, and a steering gear. The electric driving wheel is configured to perform forward and backward movements, steering, braking and energy recovery. The maglev vehicle running in the U-shaped channel can realize unmanned operation and 24-hour all-day operation.

In the U-shaped channel, the road surface of the wheel rail can be designed horizontally, uphill, downhill and turning by taken the on-site landform into consideration, the road surface of the wheel rail is designed in a lifted manner at uphill, downhill and turning locations, so that the maglev vehicle can be separated from the permanent magnet field of the magnetic track at the bottom of the U-shaped groove, the vehicle driving wheels on the road are used to support the weight of the vehicle carriage instead, which can realize the movements such as running uphill or downhill, steering of the vehicle; when the vehicle is in horizontal movement, the maglev vehicle runs to the designed horizontal magnetic track road surface, and a repulsive force is generated between the magnet at the bottom of the vehicle and the magnet on the magnetic track in the groove, to levitate the vehicle and make the maglev vehicle run horizontally.

The electromagnet mounted on the chassis can adjust the magnetic field intensity, so that the distance between the vehicle carriage and the permanent magnet of the magnetic track keeps stable for magnetic levitation; when the maglev vehicle enters a crowded area such as a station, the electromagnet can also make the permanent magnet at the bottom of the maglev vehicle lose magnetism, thus preventing the vehicle from adsorbing metallics such as iron in the station.

As the weight and number of maglev vehicles can be estimated, the load of the U-shaped channel can also be estimated, lightweight design may be adopted in the design of U-shaped channel, which can save unnecessary construction costs. Since the electric-driven maglev vehicle has no motor noise and impact sound generated by metal wheel rails, it can be set to pass through old residential areas and new residential areas, which is convenient for passengers to get on and off at the rails near their homes without leaving the community, and is also convenient for the weak and young people to go to the hospital or school, the passengers can directly get to the destination without stopping midway, which also avoids multiple accompanying personnel from going to special places.

Second Embodiment

Figure 3:
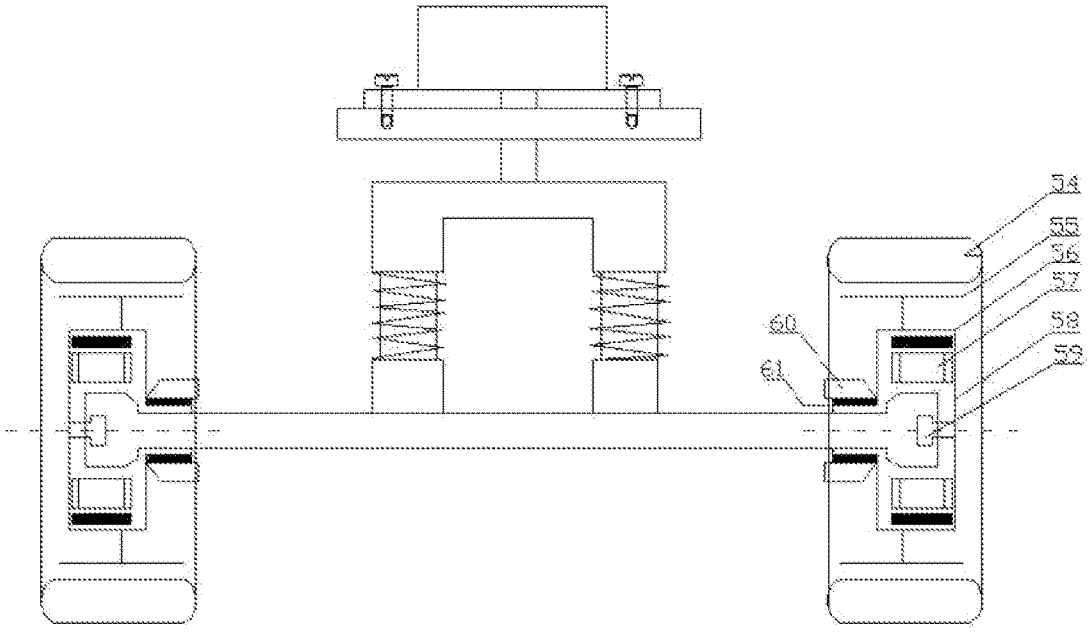
FIG. 3 is a view showing the structure of an electric driving wheel according to the present application.

A wheel-rail maglev vehicle system is shown in FIG. 3, and the structure is similar to the first embodiment with the following differences. In this embodiment, the electric driving wheel is designed in a double-wheel structure, the electric driving wheel includes wheels 25, motors, a wheel shaft, a mounting plate 27, elastic support arms 31 and an electric steering mechanism 28; both ends of the wheel shaft are respectively connected with output shafts of the two motors, each of the two motors is arranged in a center of the corresponding wheel and is fixedly connected with the wheel, and a bottom end of each of the elastic support arm 31 is fixedly connected with the wheel shaft, one side of the mounting plate 27 is fixedly connected with the carriage, and the electric steering mechanism 23 is arranged on the mounting plate and connected with top ends of the elastic support arms.

Third Embodiment

A wheel-rail maglev vehicle system is provided, and the structure is similar to the first embodiment with the following differences. In this embodiment, the front side of the carriage employs an electric driving wheel with a single-wheel structure, and the rear side of the carriage employs an electric driving wheel with a double-wheel structure; or the front side of the carriage employs an electric driving wheel with a double-wheel structure, and the rear side of the carriage employs an electric driving wheel with a single-wheel structure.

Fourth Embodiment

A wheel-rail maglev vehicle system is provided, and the structure is similar to the first embodiment with the following differences. A drainage groove 9 is provided at the bottom of the U-shaped channel. The drainage groove 9 can prevent water from accumulating at the bottom of the U-shaped channel, and after cleaning the U-shaped channel, the sewage can flow out from the drainage groove 9.

Fifth Embodiment

A wheel-rail maglev vehicle system is provided, and the structure is similar to the first embodiment with the following differences. Eight spring hydraulic support guide wheels 16 are symmetrically arranged both sides of the carriage respectively, each side of the carriage is provided with four spring hydraulic support guide wheels 16. The spring hydraulic support guide wheels 16 are unpowered, they are in contact with both two side walls of the U-shaped channel, which only play the role of balancing the vehicle body, the spring hydraulic support guide wheels can prevent the carriage from tilting and swinging to the left and right during operation.

Figure 8:
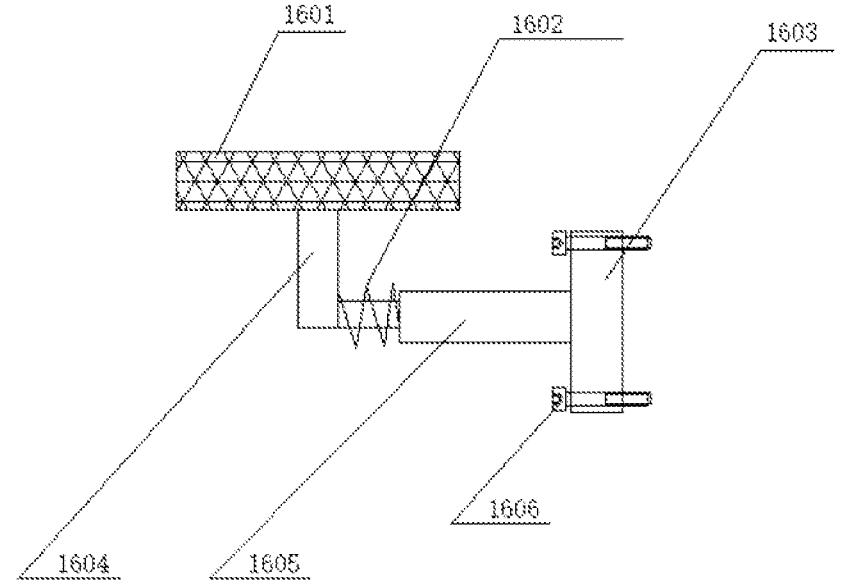
FIG. 8 is a view showing the structure of a spring hydraulic support guide wheel according to the present application.
Figure 9:
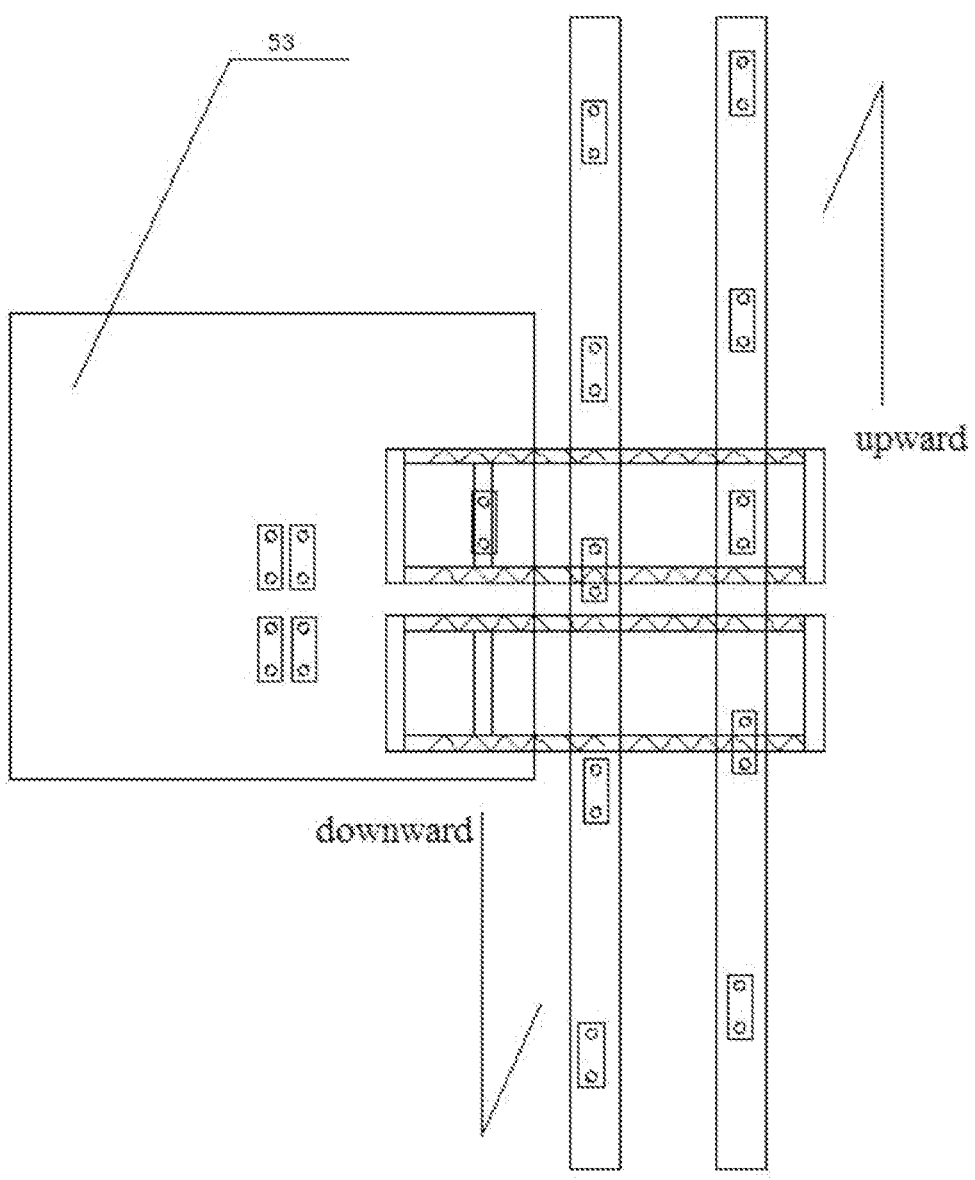
FIG. 9 is a view showing the structure of a top of the carriage according to the present application.

The specific structure of the spring hydraulic support guide wheel 16 is shown in FIG. 8, each of the spring hydraulic support guide wheels 16 includes a hydraulic support fixed seat 1603, a hydraulic cylinder 1605, a spring 1602, a guide wheel shaft 1604 and a roller 1601, a cylinder barrel of the hydraulic cylinder 1605 is fixed on the hydraulic support fixed seat 1603, the hydraulic support fixed seat 1603 is mounted on the side wall of the caniage through a bolt 1606, the spring 1602 is sleeved on the piston rod of the hydraulic cylinder 1605, a head of the piston rod is fixedly connected with the guide wheel shaft 1604, and the guide wheel shaft 1604 is connected with a center of the roller 1601 through a key connection.

The spring hydraulic support guide wheel can keep the vehicle running along the middle line of the U-shaped channel, which makes the vehicle run more smoothly, and avoids accidents due to high speed of the vehicle. When the vehicle turns at a low speed, runs uphill, enters the station, runs downhill or enters the garage, the spring hydraulic support guide wheel can be retracted, leaving a moving space for the vehicle to facilitate movement of the vehicle.

Sixth Embodiment

A wheel-rail maglev vehicle system is provided, and the structure is similar to the first embodiment with the following differences. The front and rear sides of the carriage are provided with limiting arms (not shown in the figure), the limiting arm is similar to an anti-collision beam of an automobile, which has a certain energy absorption function. The limiting arm can prevent vehicles from rear-end collision, besides, when a maglev vehicle fails to move forward, it can be pushed by the maglev vehicles at its front and rear ends to get to the station for maintenance.

Seventh Embodiment

Figure 10:
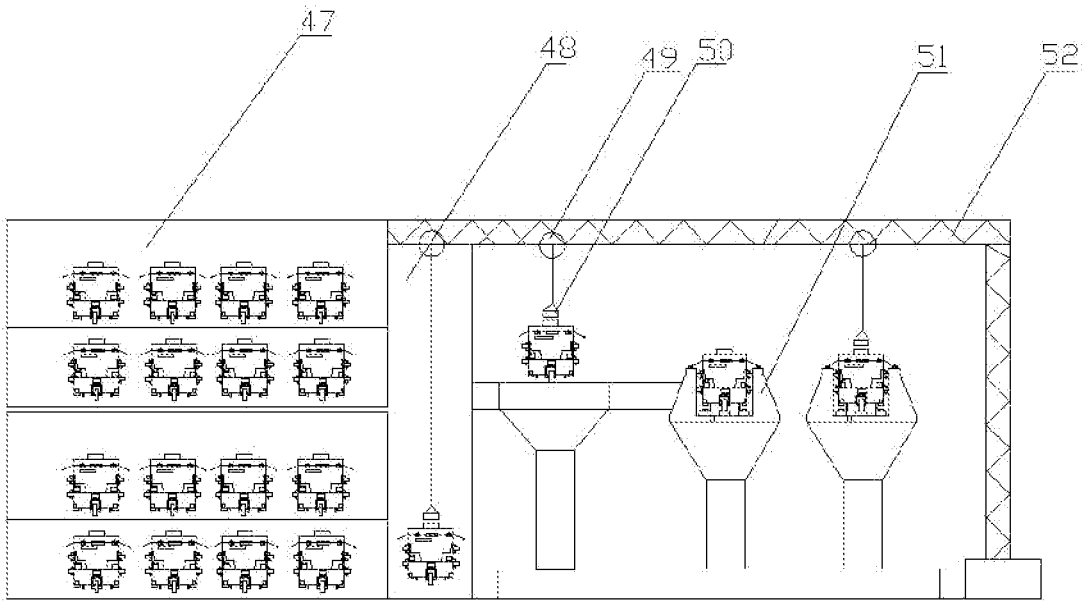
FIG. 10 is a view showing the structure of a gantry crane in a parking lot according to the present application.

A wheel-rail maglev vehicle system is provided as shown in FIG. 10, and the structure is similar to the first embodiment with the following differences. A suction cup is arranged at the top of the carriage. When the vehicle is at the station, the suction cup is convenient for the gantry crane of the station to lift the maglev vehicle off the U-shaped channel.

A large station is provided with a special stereo garage 47 and a gantry crane 52, the stereo garage 47 is used for storing empty maglev vehicles, the gantry crane is provided with a sliding crane, and the bottom of the sliding crane is connected to a magnetic suction cup 50, maglev vehicles entering the U-shaped channel of the station can be sucked by the magnetic suction cup 50 and lifted out of the U-shaped channel, thus improving the traffic efficiency.

The stereo garage 47 can allocate online maglev vehicles in real time, and timely recover empty vehicles, so that online vehicles can carry passengers and avoid energy consumption caused by unloaded vehicles. When a large number of passengers swarm into the station, the vehicles in the garage can be used to absorb the passengers in time and depart in time, which avoids the passengers waiting for the bus, thereby decreases the time that passengers stay at the station as well as the commuting time.

Eighth Embodiment

An operating method of the wheel-rail maglev vehicle system, including the following steps:

(1) stopping the maglev vehicle at a platform of a station, and controlling, by a control system, an electric carriage door to close after passengers getting on and off the carriage.

(2) starting the front driving wheel 4 and the rear driving wheel, and energizing the electromagnet, to make a repulsive force be generated between the electromagnet and the permanent magnet A, to levitate the carriage; when the passenger capacity is changed, the repulsive force between the electromagnet and the permanent magnet A can be adjusted by the electric magnetic base, to keep a stable gap between the carriage and the subgrade, which prevents the carriage from fluctuation in height.

(3) controlling the motors to be energized by the control system, so that the motor can work to drive the wheels to rotate, and the maglev vehicle can be moved forward;

(4) during a process that the maglev vehicle moves forward, controlling the energized current of the motors by the control system, to achieve acceleration or deceleration;

(5) when the vehicle is about to arrive at another station, deenergizing the electromagnet by the control system, to make the repulsive force between the electromagnet and the permanent magnet A disappear; and at the same time, deenergizing the motors by the control system, and the carriage travels into the station under inertia; under special circumstances, the gantry crane of the station uses the magnetic suction cup to quickly remove the maglev vehicle from the U-shaped channel, which does not affect the passage of subsequent vehicles. The vehicles in the stereo garage which are ready for operation may also be directly lifted and placed into the U-shaped channel for quick passage.

(6) controlling the electric carriage door to open by the control system, to allow the passengers to get on or off the carriage;

(7) repeating the steps (1) to (6), to realize continuous operation of the maglev vehicle.

The invention claimed is:

1. A wheel-rail maglev vehicle system, comprising a U-shaped channel and a maglev vehicle in the U-shaped channel; wherein two permanent magnet subgrades and one wheel subgrade are provided at a bottom of the U-shaped channel, the two permanent magnet subgrades are located at both sides of the wheel subgrade respectively, and a permanent magnet A is laid on each of the two permanent magnet subgrades;

the maglev vehicle comprises a carriage, a chassis, a front driving wheel and a rear driving wheel, wherein the front driving wheel and the rear driving wheel are connected to front and rear sides of the carriage respectively, the carriage is mounted on the chassis, a permanent magnet B is arranged at each of two sides of the chassis, the permanent magnet B corresponds to the permanent magnet A in an up and down direction and has the same polarity, and the front driving wheel and the rear driving wheel are placed on the wheel subgrade;

two sides of a top of the U-shaped channel are each provided with a power supply bus bar, two sides of the carriage are each provided with a power pick-up cable, and the power pick-up cable is in contact with the power supply bus bar to provide power for the maglev vehicle; and each of the front driving wheel and the rear driving wheel is an electric driving wheel, wherein the electric driving wheel comprises a motor, a wheel, elastic support arms, a mounting plate and an electric steering mechanism, the motor is arranged in a center of the wheel and fixedly connected with the wheel, two ends of an output shaft of the motor are connected with the elastic support arms respectively, one side of the mounting plate is fixedly connected with the carriage, and the electric steering mechanism is arranged on the mounting plate and connected with top ends of the elastic support arms; or the electric driving wheel comprises wheels, motors, a wheel shaft, a mounting plate, elastic support arms and an electric steering mechanism, both ends of the wheel shaft are respectively connected with output shafts of the two motors, each of the two motors is set in a center of the corresponding wheel and is fixedly connected with the wheel, and a bottom end of each of the elastic support arms is fixedly connected with the wheel shaft, one side of the mounting plate is fixedly connected with the carriage, and the electric steering mechanism is arranged on the mounting plate and connected with top ends of the elastic support arms.

2. The wheel-rail maglev vehicle system according to claim 1, wherein the chassis is further provided with an electromagnet, which is mainly composed of an electromagnetic coil, and the electromagnet generates magnetism by the energized electromagnetic coil.

3. The wheel-rail maglev vehicle system according to claim 1, wherein the chassis is further provided with an electric magnetic base, the electric magnetic base comprises a motor, a rotating shaft and a permanent magnet C, an output shaft of the motor is connected with the rotating shaft, and at least one permanent magnet C is arranged on the rotating shaft.

4. The wheel-rail maglev vehicle system according to claim 1, wherein eight spring hydraulic support guide wheels are symmetrically arranged at both sides of the carriage respectively, the spring hydraulic support guide wheels are in contact with both side walls of the U-shaped channel respectively.

5. The wheel-rail maglev vehicle system according to claim 1, wherein a left-right balancer is arranged at each of front and rear sides inside the carriage, the left-right balancer comprises a driving motor, a base, a screw rod and a counterweight sliding block; wherein the screw rod is arrange on the base, one end of the screw rod is connected with an output shaft of the driving motor, and the counterweight sliding block is screwed on the screw rod.

6. The wheel-rail maglev vehicle system according to claim 1, wherein a front-rear balancer is arranged at each of left and right sides inside the carriage, the front-rear balancer comprises a driving motor, a base, a screw rod and a counterweight sliding block; wherein the screw rod is arrange on the base, one end of the screw rod is connected with an output shaft of the driving motor, and the counterweight sliding block is screwed on the screw rod.

7. The wheel-rail maglev vehicle system according to claim 1, wherein a storage battery and a control system are arranged in the carriage.

8. The wheel-rail maglev vehicle system according to claim 1, wherein at least one third of the carriage is located in the U-shaped channel.

9. The wheel-rail maglev vehicle system according to claim 1, wherein the U-shaped channel comprises a flat road section and an uphill or downhill road section; and wherein in the flat road section, the wheel subgrade is flush with the permanent magnet subgrades; and in the uphill or downhill road section, the wheel subgrade is higher than the permanent magnet subgrades.

10. The wheel-rail maglev vehicle system according to claim 1, wherein the electric driving wheel is configured to perform forward and backward movements, steering, braking and energy recovery.

11. An operating method of a wheel-rail maglev vehicle system, wherein the wheel-rail maglev vehicle system comprises a U-shaped channel and a maglev vehicle in the U-shaped channel, wherein two permanent magnet subgrades and one wheel subgrade are provided at a bottom of the U-shaped channel, the two permanent magnet subgrades are located at both sides of the wheel subgrade respectively, and a permanent magnet A is laid on each of the two permanent magnet subgrades;

the maglev vehicle comprises a carriage, a chassis, a front driving wheel and a rear driving wheel, wherein the front driving wheel and the rear driving wheel are connected to front and rear sides of the carriage respectively, the carriage is mounted on the chassis, a permanent magnet B is arranged at each of two sides of the chassis, the permanent magnet B corresponds to the permanent magnet A in an up and down direction and has the same polarity, and the front driving wheel and the rear driving wheel are placed on the wheel subgrade;

two sides of a top of the U-shaped channel are each provided with a power supply bus bar, two sides of the carriage are each provided with a power pick-up cable, and the power pick-up cable is in contact with the power supply bus bar to provide power for the maglev vehicle; and each of the front driving wheel and the rear driving wheel is an electric driving wheel, wherein the electric driving wheel comprises a motor, a wheel, elastic support arms, a mounting plate and an electric steering mechanism, the motor is arranged in a center of the wheel and fixedly connected with the wheel, two ends of an output shaft of the motor are connected with the elastic support arms respectively, one side of the mounting plate is fixedly connected with the carriage, and the electric steering mechanism is arranged on the mounting plate and connected with top ends of the elastic support arms; or the electric driving wheel comprises wheels, motors, a wheel shaft, a mounting plate, elastic support arms and an electric steering mechanism, both ends of the wheel shaft are respectively connected with output shafts of the two motors, each of the two motors is set in a center of the corresponding wheel and is fixedly connected with the wheel, and a bottom end of each of the elastic support arms is fixedly connected with the wheel shaft, one side of the mounting plate is fixedly connected with the carriage, and the electric steering mechanism is arranged on the mounting plate and connected with top ends of the elastic support arms;

wherein the method comprises the following steps:

1. stopping the maglev vehicle at a platform of a station, and controlling, by a control system, an electric carriage door to close after passengers getting on and off the carriage;

2. starting the front driving wheel and the rear driving wheel by the control system, and energizing an electromagnet, to make a repulsive force be generated between the electromagnet and the permanent magnet A, to levitate the carriage;

3. controlling motors to be energized by the control system, to make the motors work to drive the wheels to rotate, and the maglev vehicle is moved forward;

4. during a process that the maglev vehicle moves forward, controlling the energized current of the motors by the control system, to achieve acceleration or deceleration;

5. when the vehicle is about to arrive at another station, deenergizing the electromagnet by the control system, to make the repulsive force between the electromagnet and the permanent magnet A disappear; and at the same time, deenergizing the motors by the control system, and the carriage travels into the station under inertia;

6. controlling the electric carriage door to open by the control system, to allow the passengers to get on or off the carriage;

7. repeating the steps 1 to 6, to realize continuous operation of the maglev vehicle.

* * * * *